US006691418B1

(12) United States Patent
Lewin et al.

(10) Patent No.: US 6,691,418 B1
(45) Date of Patent: Feb. 17, 2004

(54) ADJUSTMENT MECHANISM FOR A SAW

(75) Inventors: George Lewin, Victoria (AU); Harry Szommer, Victoria (AU); Warren Brown, Victoria (AU)

(73) Assignee: Hills Industries Limited, Edwardstown (AU)

( * ) Notice: Subject to any disclaimer, the term of this patent is extended or adjusted under 35 U.S.C. 154(b) by 0 days.

(21) Appl. No.: 09/914,249

(22) PCT Filed: Feb. 22, 2000

(86) PCT No.: PCT/AU00/00122

§ 371 (c)(1),
(2), (4) Date: Feb. 21, 2002

(87) PCT Pub. No.: WO00/51772

PCT Pub. Date: Sep. 8, 2000

(30) Foreign Application Priority Data

Feb. 26, 1999 (AU) .............................................. PP8929

(51) Int. Cl.[7] .......................... B23D 47/00; B27B 5/24; B27B 5/36

(52) U.S. Cl. ............................. 30/375; 30/376; 30/377

(58) Field of Search .......................... 30/375, 376, 377; 83/473

(56) References Cited

U.S. PATENT DOCUMENTS 4,856,394 A * 8/1989 Clowers ................... 30/376 X
4,982,501 A 1/1991 Sanerwein et al.
5,235,752 A 8/1993 Sanerwein et al.
5,452,515 A * 9/1995 Schilling ..................... 30/376
5,495,784 A 3/1996 Chen

FOREIGN PATENT DOCUMENTS

GB 2302057 1/1997

* cited by examiner

*Primary Examiner*—Douglas D. Watts
(74) *Attorney, Agent, or Firm*—Paul & Paul

(57) ABSTRACT

A circular saw including a frame, a drive means mounted to the frame coupled to a planar saw blade for rotation about a drive axis within a cutting plane and a base pivotably mounted to the frame about a first axis substantially parallel to the cutting plane and a second axis which is generally substantially parallel to the drive axis. In one aspect, the relative pivotal movement of the frame about the first axis is determined by a trim adjuster including disengageable position locator which is operable to provide a plurality of predetermined discrete engaged positions and a locking means for locking the position of the frame relative to the base over a continuous range of settings. The invention also provides a mounting assembly including a course adjustment means and a fine adjustment means to determine the pivotal movement of the frame about the second axis relative to the base.

19 Claims, 5 Drawing Sheets

ADJUSTMENT MECHANISM FOR A SAW

FIELD OF THE INVENTION

This invention relates to improvements in the mounting and alignment of saws and is particularly applicable to circular saws used for cutting a workpiece.

BACKGROUND OF THE INVENTION

In order to guide a saw blade rotating about a drive axis, the drive for the saw blade is usually mounted to a frame having a blade guard. A reference for the cutting plane of the rotating saw blade is provided by a base plate affixed to the frame through which the saw blade projects. The base plate which usually slides on its flat surface across a workpiece defines the angle of the cutting plane to the workpiece by the relative position of the cutting blade to the base plate. Hence the angle of the cutting blade is best varied by changing the angle of the cutting plane relative to the base plate. This generally occurs by pivoting the cutting plane about an axis parallel to that plane.

The depth of the cut from the cutting blade is determined by the distance below the base plate through which the blade extends. This depth is adjusted by altering the position of the base plate relative to the frame. The most common form of adjustment is simply by pivoting the frame about an axis on the base plate parallel to the drive axis of the cutting blade, thereby, in effect raising or lowering the blade relative to the base plate.

In the case of most circular saws, the adjustment mechanisms which allow adjustment of the angle of the cutting blade provide for only coarse adjustment. Consequently, precise cutting and fine adjustment of the angle and depth of a cut is difficult.

SUMMARY OF THE INVENTION

It is an object of the present invention to provide a circular saw which overcomes at least one of the adjustment problems outlined above.

Accordingly, the invention is applicable to a saw including a frame, a drive means mounted to the frame coupled to a planar saw blade for rotation about a drive axis within a cutting plane and a base pivotally mounted to the frame about a first axis substantially parallel to the cutting plane and a second axis which is generally substantially parallel to the drive axis. Conventionally the first a xis corresponds with the longitudinal axis of the saw and the second axis corresponds with the transverse axis.

In a first aspect of the invention, the pivotal movement of the frame about the second pivotal axis is determined by a mounting assembly, the mounting assembly providing a means of course adjustment of the position of the base relative to the frame and a means of fine adjustment of the position of the base relative to the frame. The mounting assembly may include a sliding height bracket and adjustably engaging the frame to provide course adjustment of the base relative to the frame and an attachment bracket engaging the frame and adjustably engaging the sliding height bracket to provide fine adjustment of the base relative to the frame. To provide fine adjustment of the position of the base relative to the frame, the attachment bracket of the mounting assembly adjustably engages the sliding height bracket. Adjustment of the position of the sliding height bracket relative to the attachment bracket by a fine adjustment mechanism provides fine adjustment of the position of the base relative to the frame.

The applicants have found that by providing a fine adjustment means and a course adjustment means, the depth of saw blade extending below the base plate can be accurately and precisely controlled. The frame is effectively pivotally mounted to the base preferably about pivot mounting which is preferably a forward pivot point and adjustably connected to the base plate at the attachment bracket through the sliding height bracket.

The frame is preferably provided with a protrusion which is slideably received within a slot in the sliding height bracket. A releaseable locking means co-operates with the protrusion to secure the position of the sliding height bracket relative to the frame. It is preferred that the sliding height bracket is further provided with an engagement stud being slidingly received and preferably extending through a guide or slot in the attachment bracket. The position of the stud within the guide of the attachment bracket may be defined by the fine adjustment mechanism. The adjustment mechanism may include a locating rod secured at one end to the engagement stud or bolt of the sliding height bracket, the locating rod preferably being provided with a screw thread. The locating rod preferably extends through a flange on the attachment bracket and is held in position by a threaded adjustment knob which abuts against the flange. The position of the sliding height bracket relative to the attachment bracket is thus adjusted by rotation of the threaded adjustment knob which varies the extension of the locating rod through the flange on the attachment bracket.

In a second preferred aspect of the invention, there is provided a saw including a frame, a drive means mounted to the frame coupled to a planar saw blade for rotation about a drive axis within a cutting plane and a base pivotally mounted to the frame about a first axis substantially parallel to the cutting plane and a second axis which is generally substantially parallel to the drive axis, wherein the pivotal movement of the frame about the second pivotal axis is determined by a mounting assembly, the mounting assembly providing a means of course adjustment of the position of the base relative to the frame and a means of fine adjustment of the position of the base relative to the frame.

The provision of a position locator allows the trim of the rotating saw blade as determined by the angle of the base plate relative to the frame to be set in one of a number predetermined discrete settings when the locator is engaged. By providing a disengaging function on the discrete position locator, the angle of the base plate relative to the frame can alternatively be set at any angle over a continuous range of angles by the locking means when the locator is disengaged.

The first pivot axis of the frame about the base is defined by a first pivot mounting on the frame and the second pivot mounting on the base, the pivotal angle being set by the trim adjuster. The position locator of the trim adjuster includes a pawl housing and a slotted cover plate, the pawl housing preferably secured to the base plate and the slotted cover plate to the front pivot bracket of the frame. The slot in the cover plate may be provided with a plurality of notches for receiving a pawl pivotable within the pawl housing between an engaged and a disengaged position.

To adjust and set a predetermined angle of the base plate relative to the cutting plane, the pawl is disengaged and the cover plate rotated relative to the housing. When the desired preset angle between the base plate and frame is reached, the pawl engages the corresponding preset notch in the cover plate.

The engagement of the pawl with the preset notch in the cover plate holds the base plate and the frame in position.

The position may be further secured by engaging the locking means having ka locking device such as a screw threaded knob or clamp which co-operates with a bolt extending through the slot in the cover plate.

If it is desirable to set the angle between the base plate and the frame at an angle which is not preset as a notch in the coverplate, then the pawl can remain disengaged and the locking means only engaged once the desired angle has been set.

In both cases whether the pawl is engaged or not, a further locking means on the second pivot mounting may be engaged once the angle between the base plate and the frame is set and the forward locking means is secured.

Since the alignment and angle of the frame corresponds with the alignment and angle of the cutting blade, adjustment of the angle of the frame relative to the base plate produces an identical corresponding adjustment of the angle of the cutting blade and cutting plane relative to the base plate. The first pivot mounting is secured to the frame and pivotally mounted to the base plate. The cover plate may be mounted to the first pivot mounting by a fine trim device for limited rotation of the cover plate relative to the first pivot mounting. When the cover plate is secured to the pawl housing either by the engagement of the pawl or the tightening of the locking means, small changes of angle can be effected. Thus small angle variations either side of the preset angles determined by the engagement of the pawl in the notches of the slot of the cover plate may be effected.

The limited pivotal movement of the coverplate relative to the first pivot mounting also enables correction of the pre-set positions of the notches relative to the pawl housing. This limited pivotal movement permits correction of any errors between the indicated angle corresponding to the engagement of the pawl in a notch and the actual angle.

Fine adjustment of the trim angle, ie. the angle of the base plate to the cutting plane is preferably provided by a fine trim device mounted to the first pivot mounting having an eccentrically mounted cam which engages a passage in the cover plate. Rotation of the fine trim device causes limited rotation of the cover plate relative to the first pivot mounting, thereby either varying the position of the cover plate relative to the pawl housing when the pawl is disengaged and the locking means is disengaged, or providing a small variation in the angle between the base plate and the frame when either or both the pawl and the locking means is engaged. In this way, when the pawl is engaged in a notch corresponding to a trim angle of 90°, angles greater than 90° can be obtained by adjustment of the securement device.

This aspect of the invention enables the angle of the base plate relative to the cutting plane to be accurately and positively set. The fine adjustment by limited rotation of the cover plate relative to the first pivot mounting further provides a means to adjust the position of the cover plate and hence the notches relative to the pawl housing and pawl to correct for errors between the actual angle and the angle indicated by the engagement of the pawl in a given notch.

The invention also provides a circular saw having the height adjustment mechanism of the first aspect of the invention and the trim adjustment mechanism of the second aspect of the invention.

Another aspect of the invention relates to positioning a circular saw or other such article beneath a fixture such as a work bench. The preferred use is with a circular saw which is mounted beneath a saw bench with the rotating circular blade extending through a gap or slot in the bench, although this aspect of the invention could equally be applied to mounting any article to a fixture where precise positioning is required.

When used for mounting a circular saw beneath a bench, the blade of the saw extends above the table acting a rip saw for cutting workpieces on the top surface of the work bench. One problem with easily demountable circular saws used in this way has always been precise positioning the rotating cutting blade with respect to the positional fittings on top of the saw bench. The correct positioning is necessary to ensure that the rotating cutting blade is correctly aligned with the direction of any intended cut. This is necessary if only the leading teeth of the saw are to be cutting the workpiece thus providing an unblemished cut.

However, mountings for circular saws and the like articles below work benches generally do not allow precise manoeuvring of the saw within the mountings under the bench. In most cases, the person mounting the saw will not be able to precisely align the blade and therefore will be forced to settle for a very small degree of mis-alignment and the resulting less-than-perfect cut.

Accordingly, in this aspect of the invention relates to a positioning assembly for use with the mountings of an article such as a circular saw to a fixture such as a work bench The assembly includes a plug to be received within an opening in the base of the article, the plug having an adjustment head such as a nut having an axis aligned eccentrically through the plug. The assembly also includes a foot to be received within the mounting on the fixture, the foot engaging the plug through the axis of the adjustable head. The adjustable head is preferably rotatable relative to the foot about the axis of the adjustable head. A shaft preferably extends through the axis of the adjustable head engaging with the foot.

The foot of the positioning assembly in accordance with this aspect of the invention is held in place on the fixture such as a work bench and the base plate of the article such as a circular saw is placed against the fixture with the adjustable head engaging the base plate.

The adjustable head rotated about its axis, due to the eccentric positioning of the axis relative to the adjustable head, alters the alignment of the base plate relative to the mounting bracket of the fixture.

The base plate of the circular saw is preferably provided with two positioning assemblies according to this aspect of the invention. The openings in the base plate for receiving the positioning assemblies are preferably positioned towards the front and rear of the base plate, thereby increasing the possible adjustment to the alignment of the base plate relative to the fixture mountings. This provides adjustment of the alignment of the rotating blade which may extend through a slot or recess in the work bench.

The features, objects and advantages of the present will become more apparent from the following description of the preferred embodiment and accompanying drawings, in which:-

FIG. 4(*b*) is a view of the device used to engage the front height bracket with the attachment bracket;

FIG. 9(*b*) is a rear perspective view of the fine trim device.

Figure 1:
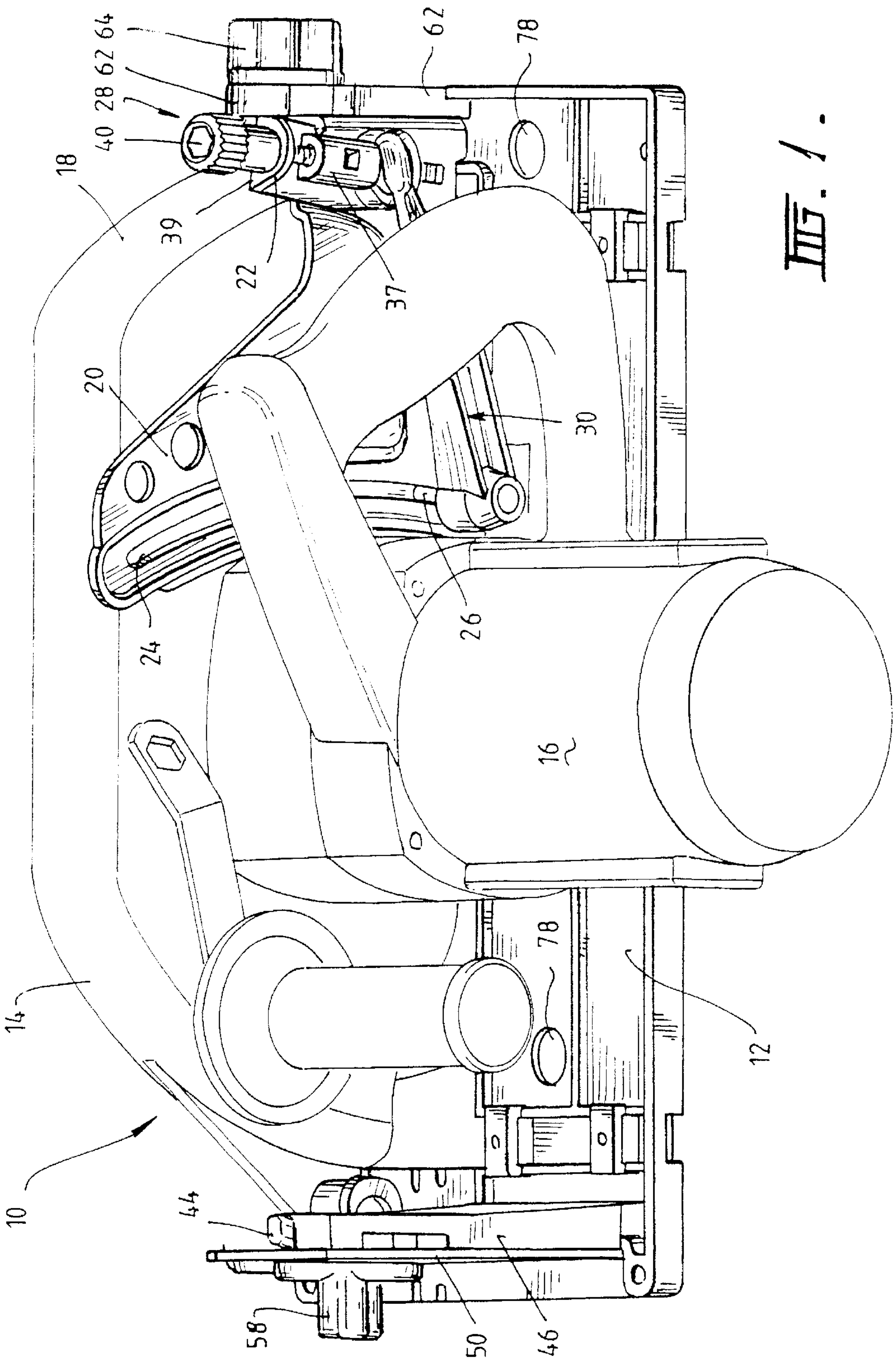
FIG. 1 is a top perspective of a circular saw in accordance with the first and second aspects of the invention.
Figure 2:
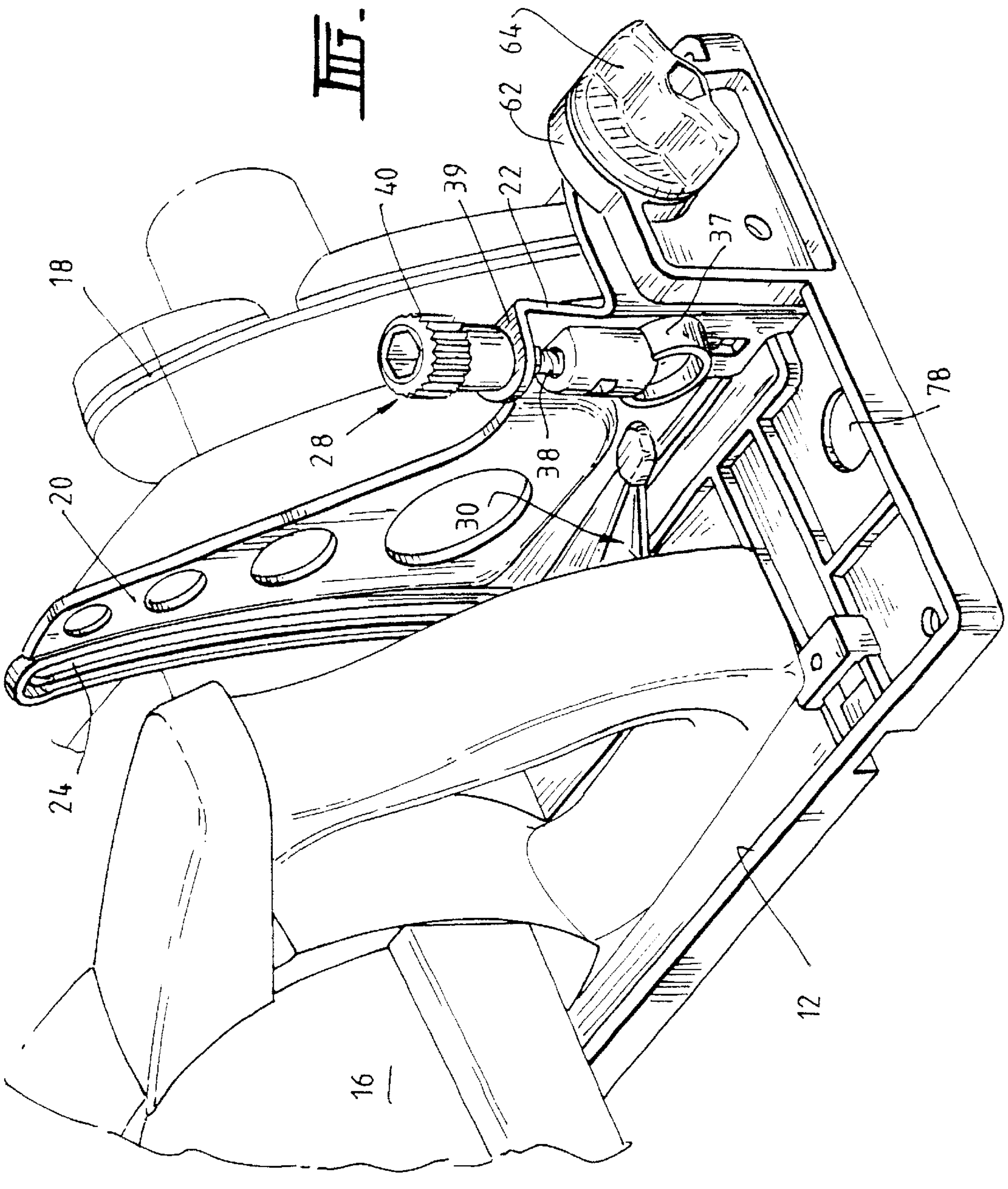
FIG. 2 is a perspective view of the rear of the saw of FIG. 1.

Referring to FIG. 1, a circular saw 10 illustrating the first and second aspects of the invention is shown. The saw includes a base plate 12 pivotally connected to a frame 14. A drive means 16 coupled to a planar saw blade (not shown) for rotation within a cutting plane is mounted to frame 14 which generally carries a guard 18 to protect the user of the saw from the rotating saw blade.

Circular saws are often provided with the ability to pivot the base about a first axis parallel to the plane of the rotating saw blade to adjust the trim of the saw and also a means to pivotally adjust the base relative to the frame about a second axis which is parallel with the drive axis of the drive means.

According to the first aspect of the invention, pivotal movement of the frame 14 about second pivot axis which is parallel to the drive axis is determined by a mounting assembly. The mounting assembly provides a means for course adjustment of the position of the base 12 relative to the frame 14 and the means of fine adjustment of the position of the base 12 relative to the frame 14. The mounting assembly includes a sliding height bracket 20 and an attachment bracket 22. The sliding height bracket is provided with a slot 24 which slideably engages with a protrusion 26 in the frame. The slot 24 is generally in the shape of an arc with the centre of the arc being the second pivot axis.

The sliding height bracket 20 is connected to the base plate 12 through the attachment bracket 22. The position of the sliding height bracket 20 relative to the attachment bracket 22 may be fixed by an adjustment mechanism 28 between the sliding height bracket 20 and the attachment bracket 22.

The course height adjustment is carried out by allowing the protrusion 26 from the frame to slide within the sliding height bracket 20 until the distance which the cutting blade protrudes from the base plate 12 is at a desired measurement. The relative positions of the sliding height bracket 20 and the protrusion 26 are then secured by a locking lever 30 which preferably has a screw thread which tightens on the protrusion and locks the sliding height bracket 20 and protrusion 26 in position.

Figure 3:
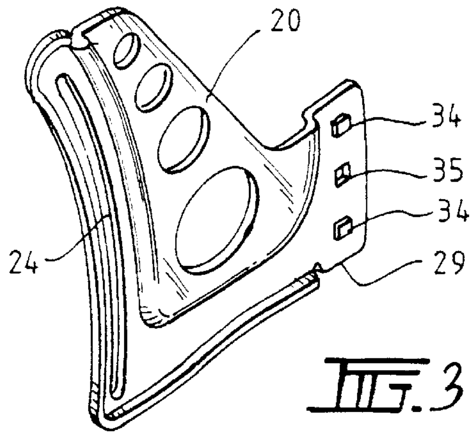
FIG. 3 is a perspective view of the forward height adjustment bracket shown in FIG. 2.
Figure 4B:
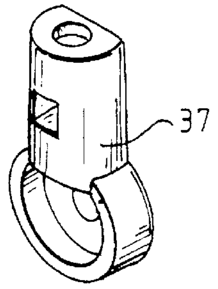
FIG. 4(*a*) is a perspective view of the attachment bracket of FIG. 2.
Figure 4A:
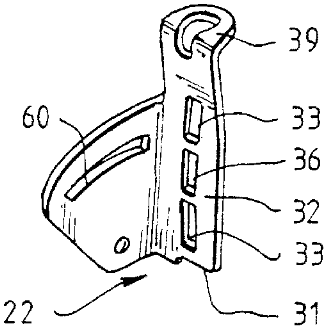
Figure 9A:
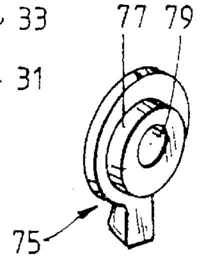
FIG. 9(*a*) is a front perspective view of the fine trim device.
Figure 9B:
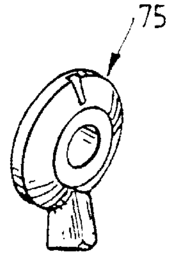
Figure 8:
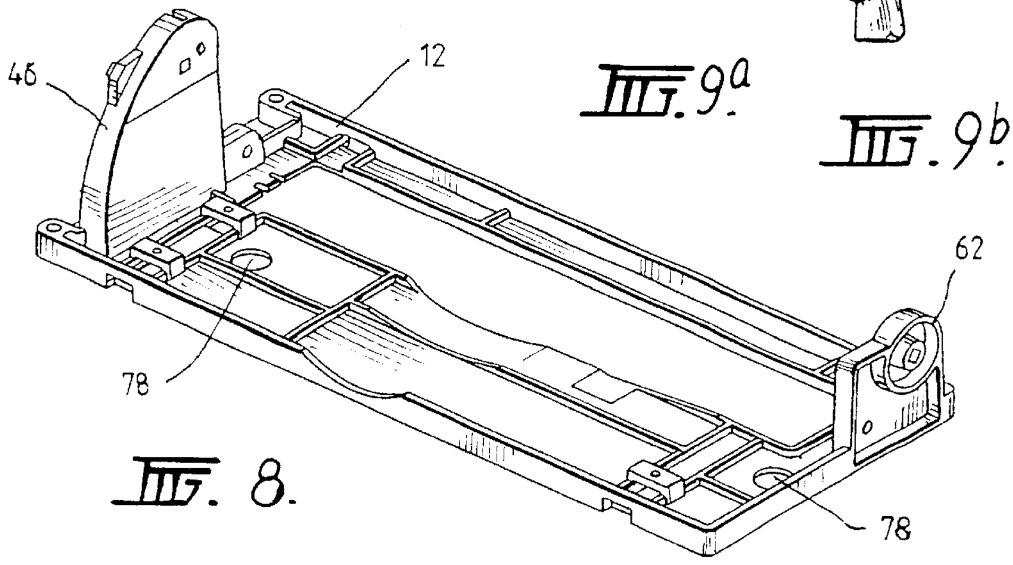
FIG. 8 is a perspective view of the base plate of the saw of FIG. 1.
Figure 5:
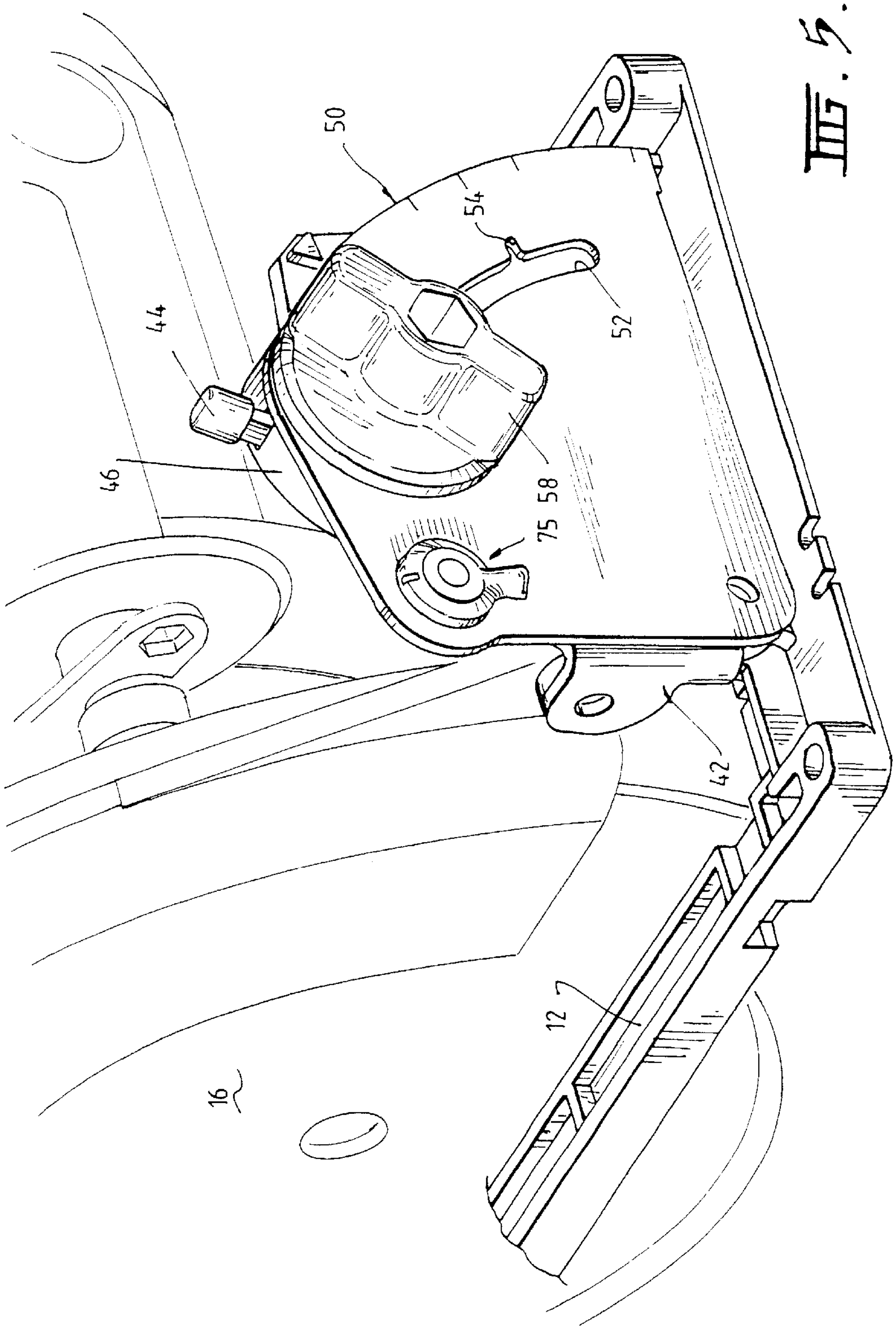
FIG. 5 is a perspective view of the front of the saw of FIG. 1.
Figure 6:
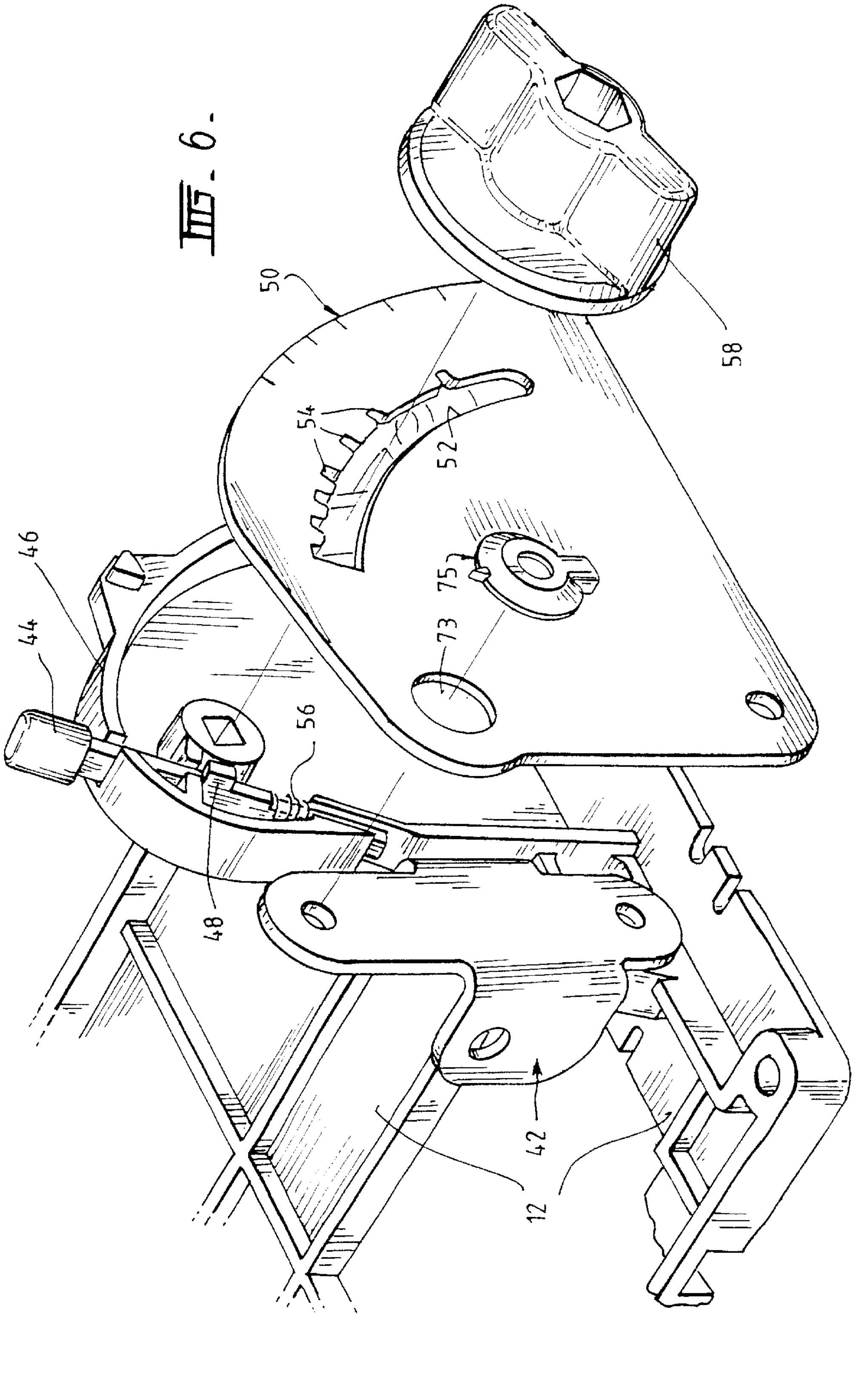
FIG. 6 is an exploded view of the trim adjuster shown in FIG. 5.

Further fine adjustment of the distance of the cutting blade protruding through the base plate is then effected by adjustment mechanism 28. Referring to FIGS. 3, 4(*a*) and 4(*b*), the attachment bracket 22 is provided with a flanged region 31 which extends towards and overlaps with a region 29 on the sliding height bracket 20. The flanged region 31 is provided with at least one guide or slot 33 for engaging with corresponding studs 34 on the sliding height bracket.

The studs are able to slide within a limited range within the guides or slots 33 with the guides or slots being formed in an arcuate shape, the centre of the arc being the second pivot axis. Hence the centre of the arc of the guides on the attachment bracket is preferably the same as the centre of the arc of the slot in the sliding height bracket.

An engagement stud or bolt (not shown), fixed in position relative to the sliding height bracket extends through the sliding height bracket 20 and slot 36 in the flanged region 31 of the attachment bracket 22 to engage a slider 37. The position of the slider 37 relative to the attachment bracket 22 is determined by an extension rod 38 which extends through a second flange 39 in the attachment bracket 22 and is held in position by an adjustment knob 40. By turning the adjustment knob 40, the position of the slider 37 and hence the position of the sliding height bracket relative to the attachment bracket can be adjusted in small increments over a limited range of movement. Thus, turning of the adjustment knob 40 is able to provide small incremental and precise changes to the height of the cutting blade through the base 12.

By a combination of the course adjustment through the adjustment of the sliding height bracket 20 and the fine adjustment provided by the rear adjustment knob 40, the height of the cutting blade extending through the base plate can be precisely set.

The trim angle of the cutting blade about the first pivot axis which is determined by the angle of the base plate 12 relative to the frame 14 may be adjusted in accordance with a second aspect of the invention. The first pivot axis of the frame about the base is determined by a first pivot mounting 42 and the second pivot bracket 22 which is preferably part of the mounting assembly In the preferred form the first pivot mounting indirectly attaches the frame to the base towards the front of the apparatus and the second pivot mounting indirectly attaches the base to the frame towards the rear of the apparatus. The pivot angle is set by a trim adjuster which includes a disengageable position locator and a locking means. The disengageable position locator includes a pawl 44 received within a pawl housing 46 secured to the base plate 12. A cover plate 50 for the pawl housing is mounted preferably capable of limited pivotal movement to first pivot mounting 42 of the frame. When the pawl is moved into the engaged position, detent 48 of pawl 44 is received within a slot 52 in the cover plate 50 The pawl 44 is biased by a means such as a spring 56 so that when the pawl is in the engaged position, detent 48 will engage with notches 54 provided in the slot 52. Notches 54 are positioned on the slot 52 to correspond with predetermined trim positions (such as say 15°, 30°, 45°) between the base plate and the frame.

When the pawl is in the engaged position, the position of the base plate 12 relative to the frame will be perfectly set by the detent being received within a notch 54 of the slot 52. To ensure that the trim angle is maintained at the set value, an additional locking means is preferably provided. The locking means includes a screw threaded stud, or bolt secured to the pawl housing and extending through the slot 52 to engage with a screw threaded knob 58. A further locking means is preferably provided on the attachment bracket 22 which in turn is provided with an arcuate slot 60. A bolt extends through arcuate slot 60 in the attachment bracket 22 and a fixture 62 in the base plate 12 and is held in position by screw threaded knob 64.

The position of the cover plate on the first pivot mounting 42 may be adjusted through a limited range of rotation by a fine trim device 75 which is preferably the uppermost attachment of two attachment points between the cover plate 50 and the first pivot mounting 42. The limited pivotal movement of the cover plate 50 relative to the first pivot mounting 42 enables correction of the pre-set positions of the notches relative to the trim housing. One benefit of this limited pivotal movement is the ability to correct errors between the indicated angle corresponding to the engagement of the pawl in a notch and the actual angle. The fine trim device 66 preferably includes an adjustment lever 75 having a cam 77 which is received within an aperture 73 in the cover plate 50. The cam 77 has a stud 79 eccentrically mounted to the cam for securement to the upper attachment point of the forward pivot mounting 42. Due to the eccentric axis through the cam rotation of the cam causes limited rotational displacement of the cover plate 50 relative to the forward pivot mounting 42.

Another benefit of the fine trim adjustment can be seen once the position of the cover plate is secured relative to the pawl housing 46 by the locking means. Rotation of the cam provides rotation of the cover plate relative to the first pivot mounting 42 thereby provides a fine adjustment to the trim of the base plate 12 relative to the frame 14. Hence, the provision of the fine trim device 75 enables the trim angle to be adjusted by up to + or −1° of any of the predetermined settings without re-adjusting the locking knob 58.

Furthermore, when the course trim adjustment by the pawl or locking means 58 is set to 90°, adjustment of the fine trim device 75 will enable the trim angle between the base plate and frame or cutting blade to be adjusted beyond 90°. Adjustment of the trim angle beyond 90° on most other circular saws has generally not been possible.

If angles other than those predetermined by the position of the notches 54 in slots 52 are required, pawl may be moved to its disengaged position so that the detent 48 does not engage slot 52 and the trim angle moved to the required value and locked into position by the locking knob 58 and knob 64 on the attachment bracket. Tightening of the tightening knob 58 and rear knob 64 is considered sufficient to maintain the trim angle at the set value.

A third aspect of the invention relates to the positioning of articles such as circular saws to a fixture such as a work bench. While this aspect of the invention is described with regard to suspending a circular saw beneath a work bench, it would be readily apparent to a person skilled in the art that this aspect of the invention may be applied the precise positioning of any article on a fixture.

Figure 7:
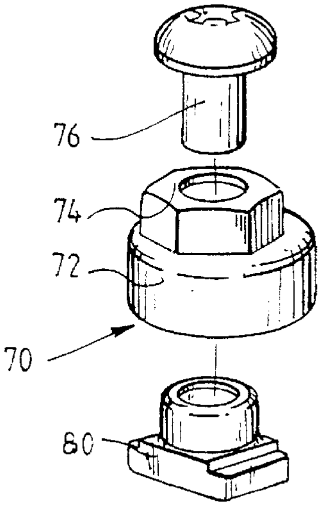
FIG. 7 is an exploded view of the positioning assembly in accordance with the third aspect of the invention.

Referring to the embodiment of this aspect of the invention, a positioning assembly 70 is shown in FIG. 7. The positioning assembly 70 includes a plug body 72 which is dimensioned to fit tightly within a recess in the article.

The plug body is provided with an adjustment head 74 such as a hexagonal nut having an axis aligned eccentrically through the plug body 72. The positioning assembly includes a foot 80 which is shaped to be received within the mounting of the fixture. The foot 80 engages the plug body 72 through the axis of the adjustable head 74. The engagement is provided by a shaft 76 which extends through the adjustable head 74 and plug body 72 along the axis of the adjustable head 74 to the foot 80.

To illustrate the use of the third aspect of the invention with a circular saw as provided in the first or second aspect of the invention, base plate 12 is provided with apertures 78 which are dimensioned to tightly receive plug bodies 70. Two feet 76 engage the underside of a work bench and are held in position by suitable means.

It is preferable to provide a positioning assembly at each end of the base plate 12 and fitted to their respective mountings so that the cutting blade which extends through the base plate and an opening in the saw bench is approximately in an aligned position. Rotation of the hexagonal nut by the appropriate tool causes minor adjustment of the base plate relative to the work bench mountings as a result of the rotation about the eccentric axis of the plug bodies 72 thereby providing a fine adjustment of the base plate of the article such as a circular saw relative to the mountings on the fixture such as a work bench.

What is claimed is:

1. A saw comprising:

a frame, a drive means mounted to the frame coupled to a planar saw blade for rotation about a drive axis within a cutting plane, and a base pivotally mounted to the frame for rotation about a first axis substantially parallel to the cutting plane and for rotation about a second axis which is generally substantially parallel to the drive axis, wherein the pivotal movement of the frame about the second pivotal axis is determined by a mounting assembly, the mounting assembly providing a first means of coarse adjustment of the position of the base relative to the frame and a second means of fine adjustment of the position of the base relative to the frame, wherein the mounting assembly includes a sliding height bracket and an attachment bracket, the sliding height bracket adjustably engaging the frame and functioning as part of the course adjustment of the base relative to the frame, and an attachment bracket engaging said frame and adjustably engaging the sliding height bracket and functioning as part of the fine adjustment of the base relative to the frame, and wherein the frame includes a protrusion which slidingly engages a slot in the sliding height bracket, and a releasable locking means being provided to secure the relative position of the protrusion within the slot of the sliding height bracket.

2. The saw of claim 1, wherein the adjustable engagement between the sliding height bracket and the attachment bracket is provided by a fine adjustment mechanism.

3. The saw of claim 2, wherein the fine adjustment mechanism includes:

a locating rod extending through a flange on the attachment bracket and secured at one end to the sliding height bracket, and a threaded adjustment knob engaging said locating rod abutting, against said flange, the extension of the locating rod through said flange being adjusted by rotation of said knob relative to said locating rod.

4. The saw of claim 3, wherein the sliding height bracket is provided with an engagement stud or bolt, said engagement stud or bolt being slidingly received within a guide in the attachment bracket and securing to one end of the locating rod.

5. A saw comprising:

a frame, a drive means mounted to the frame coupled to a planar saw blade for rotation about a drive axis within a cutting plane, and a base mounted to the frame for pivotal movement about a first axis substantially parallel to the cutting plane and for pivotal movement about a second axis which is generally substantially parallel to the drive axis, wherein the relative pivotal movement of the frame about the first pivot axis is determined by a trim adjuster, said trim adjuster including, a disengageable position locator which is operable to provide a plurality of predetermined discrete engaged positions over the range of pivotal movement of the frame relative to the base about the first axis, and a locking means for locking the position of the frame relative to the base.

6. A saw comprising:

a frame;

a drive means mounted to the frame coupled to a planar saw blade for rotation about a drive axis within a cutting plane; and a base mounted to the frame for pivotal movement about a first axis substantially parallel to the cutting plane and for pivotal movement about a second axis which is generally substantially parallel to the drive axis;

wherein the relative pivotal movement of the frame about the first pivot axis is determined by a trim adjuster, said trim adjuster including, a disengageable position locator which is operable to provide a plurality of predetermined discrete engaged positions over the range of pivotal movement of the frame relative to the base about the first axis, and a locking means for locking the position of the frame relative to the base;

wherein the disengageable position locator includes, a pawl housing and a slotted coverplate, the pawl housing being secured to one of he base or the frame and the slotted cover plate being secured to the other of the base or the frame.

7. The saw of claim 6, wherein the slotted cover plate includes a plurality of notches, corresponding to said plurality of discrete predetermined engaged positions, said pawl housing having a pawl moveable between a disengaged position and an engaged position with said notches.

8. The saw of claim 6, wherein the locking means includes a bolt extending through said slotted cover plate and cooperating with a locking device to secure the relative position of the slotted cover plate to the pawl housing.

9. The saw of claim 6, wherein the pawl housing is secured to the base plate and the slotted cover plate is mounted to a first pivot mounting on said frame.

10. The saw of claim 9, wherein the slotted cover plate is mounted to the first pivot mounting by a fine trim device for limited rotation of the cover plate relative to the first pivot mounting.

11. The saw of claim 10, wherein the fine trim device includes an adjustment lever having a cam received for rotation within an aperture in said cover plate, said cam having an eccentrically mounted stud for attachment to said first pivot mounting, whereby rotation of said lever and cam causes limited rotational displacement of cover plate relative to the first pivot mounting.

12. The saw of any one of claim 5 to 11, wherein the pivotal movement of the frame about the second pivotal axis is determined by a mounting assembly, the mounting assembly providing a means of course adjustment of the position of the base relative to the frame and a means of fine adjustment of the position of the base relative to the frame.

13. The saw of claim 12, wherein the mounting assembly is pivotally attached to a second pivot mounting on said base to allow pivotal movement of said frame and mounting assembly relative to said base about said second axis.

14. The saw of claim 13, wherein the mounting assembly further includes a locking device for fixing the relative position of the mounting assembly relative to the base plate.

15. The saw of claim 12, wherein the mounting assembly includes:

a sliding height bracket and an attachment bracket, the sliding height bracket adjustably engaging the frame to provide course adjustment of the base relative to the frame, and an attachment bracket engaging said frame and adjustably engaging the sliding height bracket to provide fine adjustment.

16. The saw of claim 15, wherein the frame includes:

a protrusion which slidingly engages a slot in the sliding height bracket, and a releasable locking means being provided to secure the relative position of the protrusion within the slot of the sliding height bracket.

17. The saw of claim 16, wherein the adjustable engagement between the sliding height bracket and the attachment bracket is provided by a fine adjustment mechanism.

18. The saw of claim 17, wherein the fine adjustment mechanism includes:

a locating rod extending through a flange on the attachment bracket and secured at one end to the sliding height bracket, and a threaded adjustment knob engaging said locating rod abutting, against said flange, the extension of the locating rod through said flange being adjusted by rotation of said knob relative to said locating rod.

19. The saw of claim 18, wherein the sliding height bracket includes ar engagement stub or bolt, said engagement stub or bolt being slidingly received within a guide in the attachment bracket and securing to one end of the locating rod.

* * * * *